United States Patent
Chou et al.

(10) Patent No.: US 10,158,874 B2
(45) Date of Patent: Dec. 18, 2018

(54) PARALLEL BYPASS AND REGULAR BIN CODING

(71) Applicant: APPLE INC., Cupertino, CA (US)

(72) Inventors: Jim C. Chou, San Jose, CA (US); Syed Muhammad Ali Rizvi, Cupertino, CA (US); Weichun Ku, San Jose, CA (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 15/087,760

(22) Filed: Mar. 31, 2016

(65) Prior Publication Data

US 2017/0094300 A1 Mar. 30, 2017

Related U.S. Application Data

(60) Provisional application No. 62/235,401, filed on Sep. 30, 2015.

(51) Int. Cl.
| | |
|---|---|
| *H04N 19/10* | (2014.01) |
| *H04N 19/70* | (2014.01) |
| *H04N 19/50* | (2014.01) |
| *H04N 19/91* | (2014.01) |
| *H04N 19/436* | (2014.01) |

(52) U.S. Cl.
CPC ........... *H04N 19/50* (2014.11); *H04N 19/436* (2014.11); *H04N 19/91* (2014.11)

(58) Field of Classification Search
CPC ........ H04N 19/50; H04N 19/91; H04N 19/70; H04N 19/40; G06F 9/3851; G06F 9/3853; G06F 9/3867
See application file for complete search history.

(56) References Cited

U.S. PATENT DOCUMENTS

| | | | | |
|---|---|---|---|---|
| 4,905,297 | A * | 2/1990 | Langdon, Jr. ........... | G06T 9/005 341/91 |
| 5,109,226 | A * | 4/1992 | MacLean, Jr. .......... | H03M 7/42 341/107 |
| 6,732,256 | B2 * | 5/2004 | Henkel ............... | G06F 9/30178 712/208 |
| 6,876,317 | B2 * | 4/2005 | Sankaran ............ | H03M 7/4006 341/107 |
| 7,079,057 | B2 * | 7/2006 | Kim ....................... | H03M 7/40 341/107 |
| 7,095,343 | B2 * | 8/2006 | Xie ..................... | H03M 7/4006 341/107 |
| 7,221,296 | B2 * | 5/2007 | Ziauddin ............. | H03M 7/4006 341/107 |
| 7,262,722 | B1 * | 8/2007 | Jahanghir ........... | H03M 7/4006 341/107 |

(Continued)

OTHER PUBLICATIONS

ITU-T, "Series H: Audiovisual and Multimedia Systems Infrastructure of audiovisual services—Coding of moving video High efficiency video coding", Apr. 2015.*

*Primary Examiner* — Sathyanaraya V Perungavoor
*Assistant Examiner* — Philip P. Dang
(74) *Attorney, Agent, or Firm* — Fletcher Yoder PC

(57) ABSTRACT

System and method for improving operational efficiency of a video encoding pipeline used to encode image data. In embodiments, the video encoding pipeline includes a transcode pipeline that provides entropy encoding of binarized syntax elements. More specifically, multiple bins may be encoded in parallel, resulting in increased encoding throughput.

17 Claims, 7 Drawing Sheets

(56) References Cited

U.S. PATENT DOCUMENTS

| | | | | |
|---|---|---|---|---|
| 7,498,960 B2* | 3/2009 | Wilson | H03M 7/4006 | 341/106 |
| 7,525,459 B2* | 4/2009 | Stein | H03M 7/4006 | 341/106 |
| 7,626,522 B2* | 12/2009 | Reznik | H03M 7/40 | 341/50 |
| 7,710,296 B2* | 5/2010 | Sze | H03M 7/4006 | 341/107 |
| 7,714,753 B2* | 5/2010 | Lu | H03M 7/4006 | 341/107 |
| 7,777,654 B2* | 8/2010 | Chang | H03M 7/4006 | 341/107 |
| 7,813,567 B2* | 10/2010 | Sankaran | H03M 7/4006 | 341/107 |
| 7,884,743 B2* | 2/2011 | Sakaguchi | H03M 7/4006 | 341/107 |
| 7,885,473 B2* | 2/2011 | Sankaran | H03M 7/4006 | 341/107 |
| 7,961,122 B1* | 6/2011 | Lin | H03M 7/4006 | 341/107 |
| 8,072,359 B2* | 12/2011 | Kasuya | H04N 19/91 | 341/106 |
| 8,213,511 B2* | 7/2012 | Swami | H04N 19/159 | 375/240.16 |
| 8,238,427 B2* | 8/2012 | Nagori | H04N 19/176 | 348/42 |
| 8,265,144 B2* | 9/2012 | Christoffersen | H04N 19/61 | 375/240.1 |
| 8,422,552 B2* | 4/2013 | Au | H03M 7/4006 | 375/240.02 |
| 8,443,413 B2* | 5/2013 | Hiers | H04N 21/23406 | 725/119 |
| 8,634,474 B2* | 1/2014 | Matsuba | H04N 19/91 | 375/240.24 |
| 8,638,850 B2* | 1/2014 | Frank | H04N 19/13 | 375/240.02 |
| 8,736,467 B2* | 5/2014 | Bossen | H03M 7/4018 | 341/107 |
| 8,907,823 B2* | 12/2014 | Marpe | H03M 7/4006 | 341/107 |
| 8,947,273 B2* | 2/2015 | Bartnik | H03M 7/40 | 341/107 |
| 9,001,882 B2* | 4/2015 | Sachdeva | H04N 19/42 | 375/240 |
| 9,077,998 B2* | 7/2015 | Wang | H04N 19/176 | |
| 2006/0126744 A1* | 6/2006 | Peng | H03M 7/4006 | 375/240.26 |
| 2008/0075376 A1* | 3/2008 | Wilson | H04N 19/13 | 382/247 |
| 2008/0118169 A1* | 5/2008 | Sohm | H03M 7/4006 | 382/247 |
| 2009/0168868 A1* | 7/2009 | Jahanghir | H03M 7/4006 | 375/240.02 |
| 2011/0080947 A1* | 4/2011 | Chen | H04N 19/13 | 375/240.12 |
| 2011/0125987 A1* | 5/2011 | Plondke | H03M 7/4006 | 712/208 |
| 2011/0200104 A1* | 8/2011 | Korodi | H03M 7/40 | 375/240.12 |
| 2011/0228858 A1* | 9/2011 | Budagavi | H04N 19/70 | 375/240.25 |
| 2011/0280314 A1* | 11/2011 | Sankaran | G06F 9/3877 | 375/240.25 |
| 2011/0310966 A1* | 12/2011 | Sankaran | H04N 19/159 | 375/240.12 |
| 2012/0014454 A1* | 1/2012 | Budagavi | H04N 19/91 | 375/240.16 |
| 2012/0163449 A1* | 6/2012 | Kotaka | H03M 7/4018 | 375/240.03 |
| 2012/0294366 A1* | 11/2012 | Eliyahu | H04N 19/533 | 375/240.16 |
| 2012/0300839 A1* | 11/2012 | Sze | H04N 19/91 | 375/240.12 |
| 2013/0051475 A1* | 2/2013 | Joshi | H04N 19/159 | 375/240.18 |
| 2013/0111188 A9* | 5/2013 | Vorbach | G06F 9/30014 | 712/11 |
| 2013/0177069 A1* | 7/2013 | Sze | H04N 19/91 | 375/240.02 |
| 2013/0272373 A1* | 10/2013 | Wong | H04N 19/00 | 375/240.01 |
| 2013/0272389 A1* | 10/2013 | Sze | H04N 19/91 | 375/240.03 |
| 2013/0298129 A1* | 11/2013 | Rabinovitch | G06F 9/381 | 718/102 |
| 2014/0010277 A1* | 1/2014 | Wang | H04N 19/70 | 375/240.02 |
| 2014/0140400 A1* | 5/2014 | George | H04N 19/52 | 375/240.12 |
| 2014/0169483 A1* | 6/2014 | Kumar | H04N 19/80 | 375/240.29 |
| 2015/0091921 A1* | 4/2015 | Cote | G06T 1/20 | 345/522 |
| 2015/0091927 A1* | 4/2015 | Cote | G06T 1/60 | 345/547 |
| 2015/0092833 A1* | 4/2015 | Ku | H04N 19/176 | 375/240.02 |
| 2015/0092834 A1* | 4/2015 | Cote | H04N 19/129 | 375/240.02 |
| 2015/0095659 A1* | 4/2015 | Courousse | G06F 9/3001 | 713/190 |
| 2015/0264373 A1* | 9/2015 | Wang | H04N 19/44 | 375/240.25 |

* cited by examiner

PARALLEL BYPASS AND REGULAR BIN CODING

CROSS REFERENCE TO RELATED APPLICATIONS

This application is a Non-Provisional patent application of U.S. Provisional Patent Application No. 62/235,401, entitled "Parallel Bypass and Regular Bin Coding", filed Sep. 30, 2015, which is herein incorporated by reference in its entirety and for all purposes.

BACKGROUND

The present disclosure generally relates to image data encoding and, more particularly, parallel coding for multiple bin (e.g., bypass and regular bins) to improve throughput in image data encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Often, an electronic device may present visual representations of information as image frames displayed on an electronic display based on image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, a syntax element binarization process may define a mapping of syntax element values to sequences of binary symbols, or bins. A syntax element binarization (SEB) block may output a bin stream having header and residual syntax elements for each basic processing unit in High Efficiency Video Coding (HEVC), otherwise known as a coding tree unit (CTU).

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the image frames to another electronic device and/or a network. As such, the ability to display and/or transmit in real-time or near real-time may be based at least in part on efficiency with which the image data is encoded. Unfortunately, because regular bins are encoded based upon their associated context, the encoding regular bins may be significantly more complex than encoding bypass bins. The context may be updated after each encoding, resulting in increased serialization of the bin encoding process, resulting in reduced throughput. For high bit rates, the residual syntax consumes a large percentage of the bit rate, which is encoded as bypass bins. In some embodiments, an increase in throughput may be obtained by processing bypass bins and regular bins in parallel.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to encoding source image data, which may enable reducing transmission bandwidth and/or memory usage. To facilitate, a video encoding pipeline may determine encoding operational parameters and implement the encoding operational parameters to encode the source image data. In some embodiments, the source image data may be encoded using parallel bin encoding techniques that group and encode multiple bins at the same time.

To implement these parallel bin encoding techniques, a hardware block within the video encoding pipelines (e.g., a bin serialization block) may group encoded bins that it receives. For example, a syntax element parser (SEP) block may generate and provide bins to a bin serialization block. The bin serialization block may group the bins to facilitate parallel encoding of multiple bins. For example, in some embodiments, the bins may be grouped based upon bin indexes associated with each of the respective bins. The grouped bins may be provided to the binary arithmetic encoder (BAC) block, where the BAC block may encode the bins and provide the encoded bins as output.

Accordingly, the present disclosure provides techniques to improve operational efficiency of the video encoding pipeline. In some embodiments, operational efficiency may be improved by controlling a bit-rate of certain features in the video encoding pipeline based upon a bit-rate estimation calculated from one or more collected bit-rate statistics.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Further, the hardware blocks discussed herein may be specific circuitry that implements the described features and/or may be processors configured to execute processor-readable instructions that implement the described features. The processor-readable instructions may be stored on a tangible, non-transitory, processor-readable medium.

As mentioned above, an electronic device may facilitate visually presenting information by instructing an electronic display to display image frames based on image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits), which, for example, may reduce transmission bandwidth and/or memory address usage.

To facilitate encoding, source image data for an image frame may be divided into one or more coding units. As used herein, a "coding unit" (CU) is intended to describe a sample of source image data (e.g., pixel image data) corresponding to a group of display pixels, which is encoded using the same prediction technique. Further, as used herein, a "coding tree unit" refers to a group of CUs that make up the largest coding unit size for High Efficiency Video Coding (HEVC).

Figure 1:
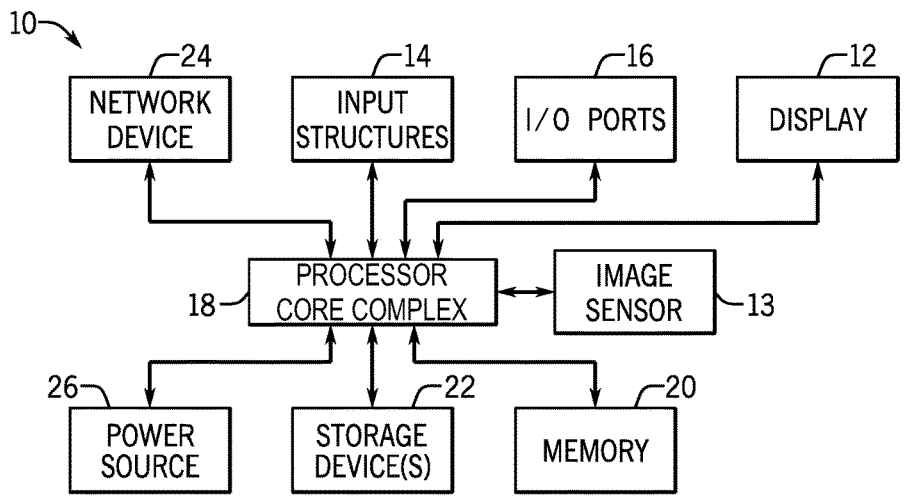
FIG. 1 is a block diagram of a electronic device, in accordance with an embodiment.

In some embodiments, a video encoding pipeline may be enhanced with additional encoding throughput by enabling parallel bin encoding of multiple bins. To help illustrate, a computing (e.g., electronic) device 10 that may utilize an electronic display 12 to display image frames based on image data and/or an image sensor 13 to capture image data is described in FIG. 1. As will be described in more detail below, the computing device 10 may be any suitable computing device, such as a handheld computing device, a tablet computing device, a notebook computer, and the like. Thus, it should be noted that FIG. 1 is merely one example of a particular implementation and is intended to illustrate the types of components that may be present in the computing device 10.

In the depicted embodiment, the computing device 10 includes the electronic display 12, the image sensor 13, input structures 14, input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor core complex 18 is operably coupled with local memory 20 and the main memory storage device 22. Thus, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

The local memory 20 and/or the main memory storage device 22 may be tangible, non-transitory, computer-readable mediums that store instructions executable by and data to be processed by the processor 18. For example, the local memory 20 may include random access memory (RAM) and the main memory storage device 22 may include read only memory (ROM), rewritable flash memory, hard drives, optical discs, and the like. By way of example, a computer program product containing the instructions may include an operating system or an application program.

Additionally, as depicted, the processor core complex 18 is operably coupled with the network interface 24. Using the network interface 24, the computing device 10 may communicatively couple to a network and/or other computing devices. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the computing device 10 to transmit encoded image data to a network and/or receive encoded image data from the network for display on the electronic display 12.

Furthermore, as depicted, the processor core complex 18 is operably coupled with I/O ports 16, which may enable the computing device 10 to interface with various other electronic devices. For example, a portable storage device may be connected to an I/O port 16, thereby enabling the processor core complex 18 to communicate data with a portable storage device. In this manner, the I/O ports 16 may enable the computing device 10 to output encoded image data to the portable storage device and/or receive encoding image data from the portable storage device.

As depicted, the processor core complex 18 is also operably coupled to the power source 26, which may provide power to the various components in the computing device 10. The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the computing device 10. The inputs structures 14 may include buttons, keyboards, mice, trackpads, and the like. Additionally or alternatively, the electronic display 12 may include touch components that enable user inputs to the computing device 10 by detecting occurrence and/or position of an object touching its screen (e.g., surface of the electronic display 12).

In addition to enabling user inputs, the electronic display 12 may present visual representations of information by display image frames, such as a graphical user interface (GUI) of an operating system, an application interface, a still image, or video content. As described above, the electronic display 12 may display the image frames based on image data. In some embodiments, the image data may be received from other computing devices 10, for example, via the network interface 24 and/or the I/O ports 16. Additionally or alternatively, the image data may be generated by computing device 10 using the image sensor 13. In some embodiments, image sensor 13 may digitally capture visual representations of proximate physical features as image data.

As described above, the image data may be encoded (e.g., compressed), for example by the computing device 10 that generated the image data, to reduce number of memory addresses used to store and/or bandwidth used to transmit the image data. Once generated or received, the encoded image data may be stored in local memory 20. Accordingly, to display image frames, the processor core complex 18 may retrieve encoded image data from local memory 20, decode the encoded image data, and instruct the electronic display 12 to display image frames based on the decoded image data.

Figure 2:
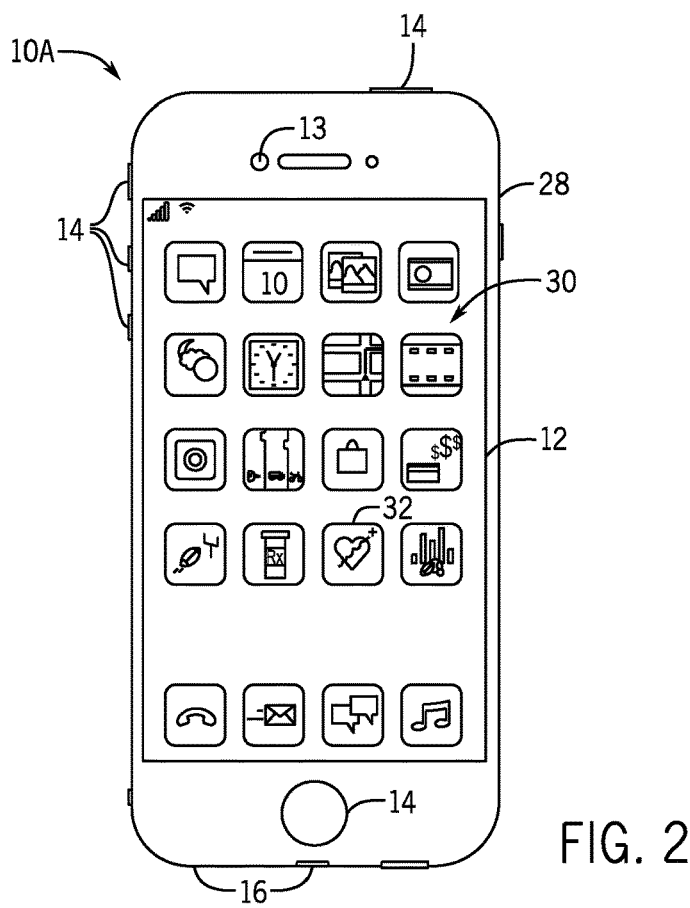
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
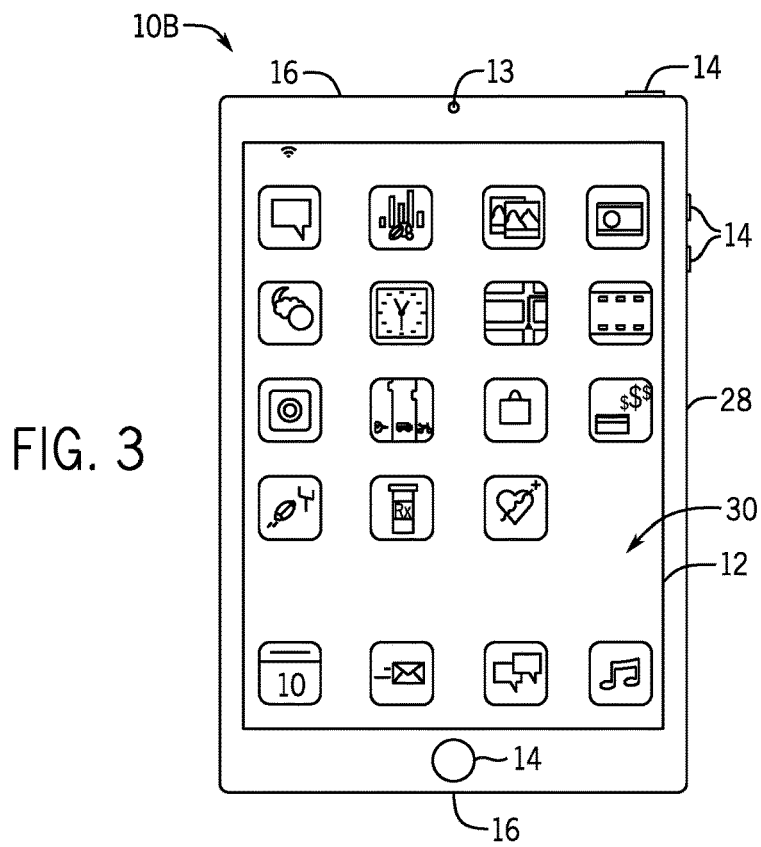
FIG. 3 is an example of the electronic device of FIG. 1, in accordance with an embodiment.
Figure 4:
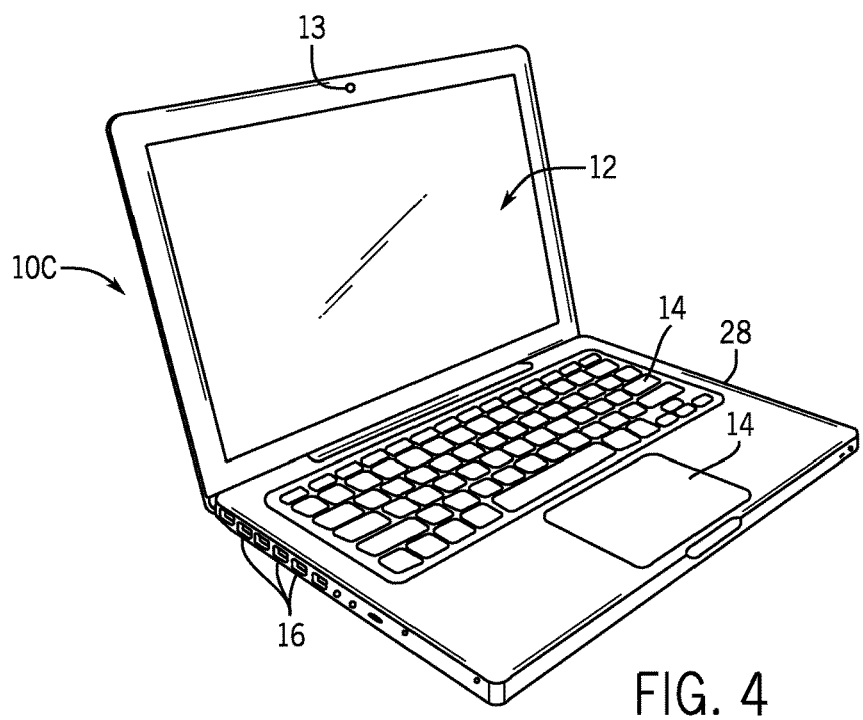
FIG. 4 is an example of the electronic device of FIG. 1, in accordance with an embodiment.
Figure 5:
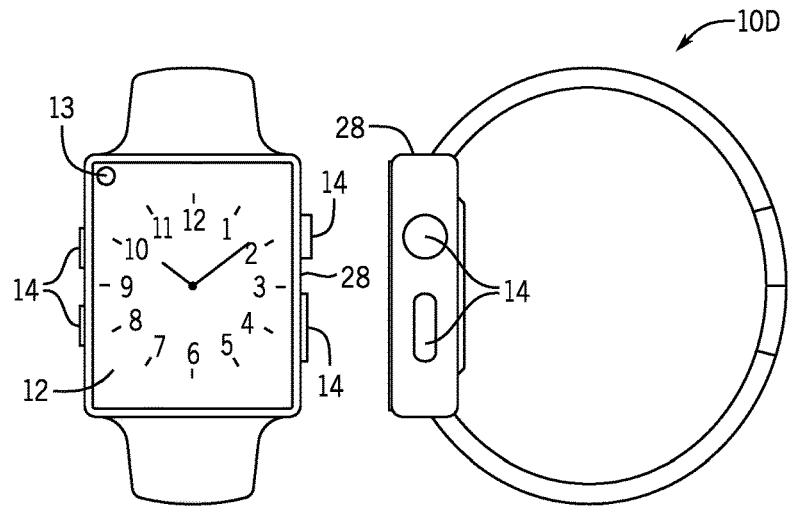
FIG. 5 is an example of the electronic device of FIG. 1, in accordance with an embodiment.

To further illustrate a suitable computing device 10, a tablet device 10B is described in FIG. 3. For example, the tablet device 10B may be any iPad® model available from Apple Inc. Additionally, in other embodiments, the computing device 10 may take the form of a computer 10C as described in FIG. 4. For example, the computer 10C may be any Macbook® or iMac® model available from Apple Inc. Furthermore, in other embodiments, the computing device 10 may take the form of a watch 10D as described in FIG. 5. For example, the watch 10D may be any Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, source (e.g., compressed) image data may be encoded (e.g., compressed) to reduce resource usage. Additionally, in some embodiments, the duration between generation of image data and display of image frames based on the image data may be limited to enable real-time or near real-time display and/or transmission of generated image frames. For example, image data captured by the image sensor 13 may be displayed on the electronic display 12 with minimal delay to enable a user to determine physical features proximate the image sensor 13 in real-time or near real-time. Additionally, image data generated by the computing device 10 (e.g., by the image sensor 13) may be transmitted (e.g., broadcast) to one or more other computing devices 10 to enable a real-time or near real-time streaming. To enable real-time or near real-time transmission and/or display, duration available to encode image data may be limited, particularly as resolution of image frames and/or refresh rates of electronic displays 12 increase.

Figure 6:
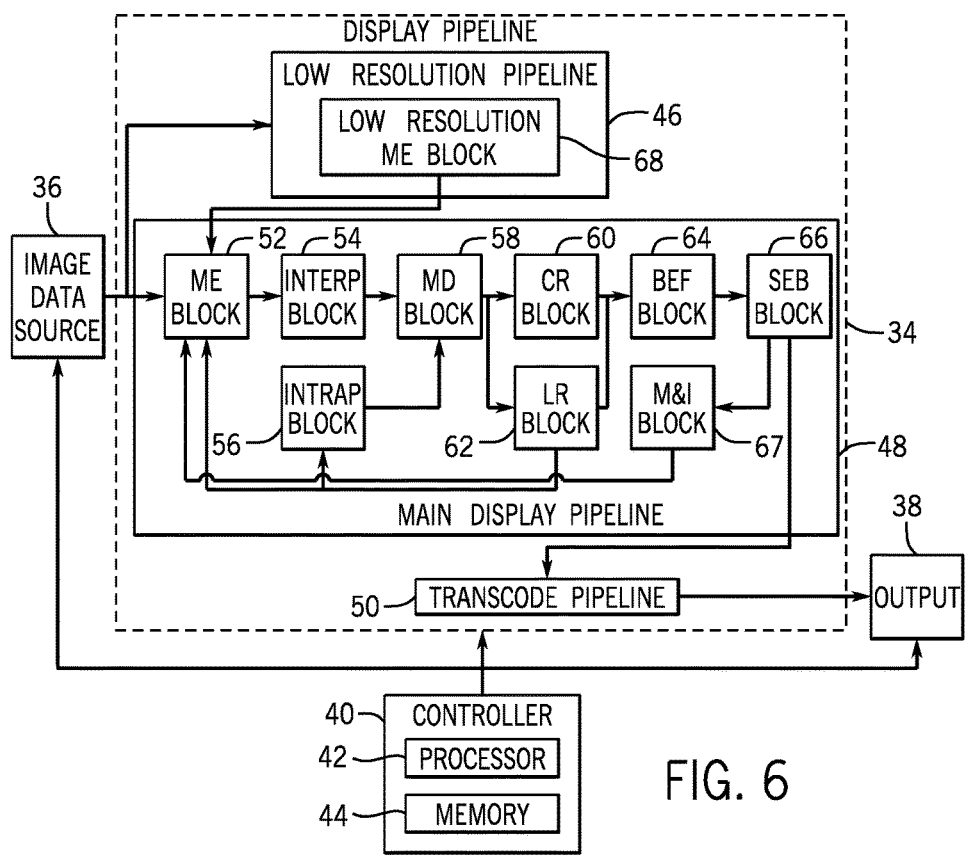
FIG. 6 is block diagram of a video encoding pipeline used to encode image data, in accordance with an embodiment.

One embodiment of a video encoding pipeline 34 that may be used to encode image data is described in FIG. 6. As depicted, the video encoding pipeline 34 is communicatively coupled to an image data source 36, an output 38, and a controller 40. In the depicted embodiment, the controller 40 may generally control operation of image data source 36, the video encoding pipeline 34, and the output 38. Although depicted as a single controller 40, in other embodiments, one or more separate controllers 40 may be used to control operation of the image data source 36, the video encoding pipeline 34, the output 38, or any combination thereof.

To facilitate controlling operation, the controller 40 may include a controller processor 42 and controller memory 44. In some embodiments, the controller processor 42 may execute instructions and/or process data stored in the controller memory 44 to control operation of the image data source 36, the video encoding pipeline 34, and/or the output 38. In other embodiments, the controller processor 42 may be hardwired with instructions that control operation in the image data source 36, the video encoding pipeline 34, and/or the output 38 when executed. Additionally, in some embodiments, the controller processor 42 may be included in the processor core complex 18 and/or separate processing circuitry (e.g., in the electronic display) and the controller memory 44 may be included in local memory 20 and/or a separate, tangible, non-transitory computer-readable medium (e.g., in the electronic display).

As depicted, the video encoding pipeline 34 is communicatively coupled to the image data source 36. In this manner, the video encoding pipeline 34 may receive source image data from the image data source 36. Thus, in some embodiments, the image data source 36 may be the image sensor 13 and/or any other suitable device that generates and/or provides source image data.

Additionally, as depicted, the video encoding pipeline 34 is communicatively coupled to the output 38. In this manner, the video encoding pipeline 34 may output encoded (e.g., compressed) image data to the output 38, for example, for storage and/or transmission. Thus, in some embodiments, the output 38 may include the local memory 20, the storage device 22, the network interface 24, the I/O ports 16, the controller memory 44, or any combination thereof.

To facilitate generating encoded image data, the video encoding pipeline 34 may include multiple parallel pipelines. For example, in the depicted embodiment, the video encoding pipeline 34 includes a low resolution pipeline 46, a main pipeline 48, and a transcode pipeline 50. As will be described in more detail below, the main pipeline 48 may encode source image data using prediction techniques (e.g., inter-frame prediction techniques or intra-frame prediction techniques) and the transcode pipeline 50 may subsequently entropy encode syntax elements that indicate encoding operational parameters (e.g., quantization coefficient, inter-frame prediction mode, and/or intra-frame prediction mode) used to prediction encode the image data.

To facilitate prediction encoding source image data, the main pipeline 48 may perform various functions. To simplify discussion, the functions are divided between various blocks in the main pipeline 48. In the depicted embodiment, the main pipeline 48 includes a motion estimation (ME) block 52, an inter-frame prediction (InterP) block 54, an intra-frame prediction (IntraP) block 56, a mode decision (MD) block 58, a chroma reconstruction (CR) block 60, a luma reconstruction (LR) block 62, a back-end-filter (BEF) block 64, and a syntax element binarization (SEB) block 66. A Macroblock input (MBI) block 67 may also be included.

As depicted, the motion estimation block 52 is communicatively coupled to the image data source 36. In this manner, the motion estimation block 52 may receive source image data from the image data source 36, which may include a luma component (e.g., Y) and two chroma components (e.g., Cr and Cb). In some embodiments, the motion estimation block 52 may process one coding unit, including one luma coding block and two chroma coding blocks, at a time. As used herein a "luma coding block" is intended to describe the luma component of a coding unit and a "chroma coding block" is intended to describe a chroma component of a coding unit. In some embodiments, the luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half the resolution of the coding unit when a 4:2:2 sampling format is used and a quarter the resolution of the coding unit when a 4:2:0 sampling format is used.

As described above, a coding unit may include one or more prediction units, which may each be encoded using the same prediction technique, but different prediction modes. Each prediction unit may include one luma prediction block and two chroma prediction blocks. As used herein a "luma prediction block" is intended to describe the luma component of a prediction unit and a "chroma prediction block" is intended to describe a chroma component of a prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter-frame prediction modes that can be used to encode a prediction unit. An inter-frame prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter-frame prediction mode, the motion estimation block 52 may search reconstructed luma image data, which may be received from the luma reconstruction block 62. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample.

In this manner, the motion estimation block 52 may determine candidate inter-frame prediction modes (e.g., reference index and motion vector) for one or more prediction units in the coding unit. The motion estimation block 52 may then input candidate inter-frame prediction modes to the inter-frame prediction block 54. Based at least in part on the candidate inter-frame prediction modes, the inter-frame prediction block 54 may determine luma prediction samples.

In some embodiments, the inter-frame prediction block 54 may determine a luma prediction sample by applying motion compensation to a reference sample indicated by a candidate inter-frame prediction mode. For example, the inter-frame prediction block 54 may apply motion compensation by determining luma of the reference sample at fractional (e.g., quarter or half) pixel positions. The inter-frame prediction block 54 may then input the luma prediction sample and corresponding candidate inter-frame prediction mode to the mode decision block 58 for consideration. In some embodiments, the inter-frame prediction block 54 may sort the candidate inter-frame prediction modes based on associated mode cost and input only a specific number to the mode decision block 58.

The mode decision block 58 may also consider one or more candidate intra-frame predictions modes and corresponding luma prediction samples output by the intra-frame prediction block 56. The main pipeline 48 may be capable of using multiple (e.g., 9 or 35) different intra-frame prediction modes to generate luma prediction samples based on adjacent pixel image data. Thus, in some embodiments, the intra-frame prediction block 56 may determine a candidate intra-frame prediction mode and corresponding luma prediction sample for a prediction unit based at least in part on luma of reconstructed image data for adjacent (e.g., top, top right, left, or bottom left) pixels, which may be received from the luma reconstruction block 62.

For example, utilizing a vertical prediction mode, the intra-frame prediction block 56 may set each column of a luma prediction sample equal to reconstructed luma of a pixel directly above the column. Additionally, utilizing a DC prediction mode, the intra-frame prediction block 45 may set a luma prediction sample equal to an average of reconstructed luma of pixels adjacent the prediction sample. The intra-frame prediction block 56 may then input candidate intra-frame prediction modes and corresponding luma prediction samples to the mode decision block 58 for consideration. In some embodiments, the intra-frame prediction block 56 may sort the candidate intra-frame prediction modes based on associated mode cost and input only a specific number to the mode decision block 58.

The mode decision block 58 may determine encoding operational parameters used to encode the source image data (e.g., coding block). In some embodiments, the encoding operational parameters for a coding block may include prediction technique (e.g., intra-prediction techniques or inter-frame prediction techniques) for the coding block, number of prediction units in the coding block, size of the prediction units, prediction mode (e.g., intra-prediction modes or inter-frame prediction modes) for each of the prediction unit, number of transform units in the coding block, size of the transform units, whether to split the coding unit into smaller coding units, or any combination thereof.

To facilitate determining the encoding operational parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra-frame prediction techniques.

On the other hand, in a P-frame or B-frame, source image data may be encoded by referencing image data used to display the same image frame and/or a different image frames. More specifically, in a P-frame, source image data may be encoding by referencing image data used to display a previous image frame. Additionally, in a B-frame, source image data may be encoded by referencing both image data used to display a previous image frame and image data used to display a subsequently image frame. Accordingly, when the image frame is a P-frame or a B-frame, the mode decision block 58 may determine each coding unit in the image frame may be prediction encoded using either intra-frame techniques or inter-frame techniques.

Although using the same prediction technique, the configuration of luma prediction blocks in a coding unit may vary. For example, the coding unit may include a variable number of luma prediction blocks at variable locations within the coding unit, which each uses a different prediction mode. As used herein, a "prediction mode configuration" is intended to describe number, size, location, and prediction mode of luma prediction blocks in a coding unit. Thus, the mode decision block 58 may determine a candidate inter-frame prediction mode configuration using one or more of the candidate inter-frame prediction modes received from the inter-frame prediction block 54. Additionally, the mode decision block 58 may determine a candidate intra-frame prediction mode configuration using one or more of the candidate intra-frame prediction modes received from the intra-frame prediction block 56.

Since a coding block may utilize the same prediction technique, the mode decision block 58 may determine prediction technique for a coding unit by comparing rate-distortion cost associated with the candidate prediction mode configurations and/or a skip mode. In some embodiments, the rate-distortion cost may be as follows:

$$RD = A(\text{rate\_Cost}) + B(\text{distortion}) \quad (1)$$

where RD is the rate-distortion cost, rate is estimated rate expected to be used to indicate the source image data, distortion is a distortion metric (e.g., sum of squared difference), A is a weighting factor for the estimated rate, and B is a weighting factor for the distortion metric.

The distortion metric may indicate an amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the luma reconstruction block 62. As will be described in more detail below, reconstructed image data may be generated by subtracting a prediction sample from source image data to determine a prediction residual, performing a forward transform and quantization (FTQ) on the prediction residual, performing an inverse transform and quantization (ITQ) to determine a reconstructed prediction residual, and adding the reconstructed prediction residual to the prediction sample.

In some embodiments, the prediction residual of a coding unit may be transformed as one or more transform units. As used herein, a "transform unit" is intended to describe a sample within a coding unit that is transformed together. In some embodiments, a coding unit may include a single transform unit. In other embodiments, the coding unit may be divided into multiple transform units, which is each separately transformed.

Additionally, the estimated rate for an intra-frame prediction mode configuration may include expected number of bits used to indicate intra-frame prediction technique (e.g., coding unit overhead), expected number of bits used to indicate intra-frame prediction mode, expected number of bits used to indicate a prediction residual (e.g., source image data—prediction sample), and expected number of bits used to indicate a transform unit split. On the other hand, the estimated rate for an inter-frame prediction mode configuration may include expected number of bits used to indicate inter-frame prediction technique, expected number of bits used to indicate a motion vector (e.g., motion vector difference), and expected number of bits used to indicate a transform unit split. Additionally, the estimated rate of the skip mode may include number of bits expected to be used to indicate the coding unit when prediction encoding is skipped.

In embodiments where the rate-distortion cost of equation (1) is used, the mode decision block 58 may select prediction mode configuration or skip mode with the lowest associated rate-distortion cost for a coding unit. In this manner, the mode decision block 58 may determine encoding operational parameters for a coding block, which may include prediction technique (e.g., intra-prediction techniques or inter-frame prediction techniques) for the coding block, number of prediction units in the coding block, size of the prediction units, prediction mode (e.g., intra-prediction modes or inter-frame prediction modes) for each of the prediction unit, number of transform units in the coding block, size of the transform units, whether to split the coding unit into smaller coding units, or any combination thereof.

To improve quality of decoded image data, the main pipeline 48 may then mirror decoding of encoded image data. To facilitate, the mode decision block 58 may output the encoding operational parameters and/or luma prediction samples to the chroma reconstruction block 60 and the luma reconstruction block 62. Based on the encoding operational parameters, the luma reconstruction block 62 and the chroma reconstruction block 60 may determine reconstruct image data.

More specifically, the luma reconstruction block 62 may generate the luma component of reconstruct image data. In some embodiments, the luma reconstruction block 62 may generate reconstructed luma image data by subtracting the luma prediction sample from luma of the source image data to determine a luma prediction residual. The luma reconstruction block 62 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The luma reconstruction block 62 then add the reconstructed luma prediction residual to the luma prediction sample to determine reconstructed luma image data. As described above, the reconstructed luma image data may then be fed back for use in other blocks in the main pipeline 48. Additionally, the reconstructed luma image data may be output to the back-end-filter block 64.

On the other hand, the chroma reconstruction block 60 may generate both chroma components of reconstructed image data. In some embodiments, chroma reconstruction may be dependent on sampling format. For example, when luma and chroma are sampled at the same resolution (e.g., 4:4:4 sampling format), the chroma reconstruction block 60 may utilize the same encoding operational parameters as the luma reconstruction block 62. In such embodiments, for each chroma component, the chroma reconstruction block 60 may generate a chroma prediction sample by applying the prediction mode configuration determined by the mode decision block 58 to adjacent pixel image data.

The chroma reconstruction block 60 may then subtract the chroma prediction sample from chroma of the source image data to determine a chroma prediction residual. Additionally, the chroma reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, what may be input to the back-end-filter block 64.

However, in other embodiments, chroma sampling resolution may vary from luma sampling resolution, for example when a 4:2:2 or 4:2:0 sampling format is used. In such embodiments, encoding operational parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve quality of decode image data, the back-end-filter block 64 may then filter the reconstructed image data (e.g., reconstructed chroma image data and/or reconstructed luma image data). In some embodiments, the back-end-filter block 64 may perform deblocking and/or sample adaptive offset (SAO) functions. For example, the back-end-filter block 64 may perform deblocking on the reconstructed image data to reduce perceivability of blocking artifacts that may be introduced. Additionally, the back-end-filter block 64 may perform a sample adapt offset function by adding offsets to portions of the reconstructed image data.

To enable decoding, encoding operational parameters used to generate encoded image data may be communicated to a decoding device. In some embodiments, the encoding operational parameters may include the encoding operational parameters determined by the mode decision block 58 (e.g., prediction unit configuration and/or transform unit configuration), encoding operational parameters used by the luma reconstruction block 62 and the chroma reconstruction block (e.g., quantization coefficients), and encoding operational parameters used by the back-end-filter block 64. To facilitate communication, the encoding operational parameters may be expressed as syntax elements. For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

In some embodiments, resources used to communicate the encoding operational parameters may be reduced using entropy encoding, such as context adaptive binary arithmetic coding (CABAC) and/or context-adaptive variable-length coding (CAVLC). To facilitate, the syntax element binarization (SEB) block 66 may receive encoding operational parameters expressed as syntax elements from the mode decision block 58, the luma reconstruction block 62, the chroma reconstruction block 60, and/or the back-end-filter block 64. The syntax element binarization block 66 may then binarize a syntax element by mapping the syntax element to a corresponding binary symbol, which includes one or more bins (e.g., "0" or "1"). In some embodiments, the syntax element binarization block 66 may generate the binary symbol using exp-golomb, fixed length, truncated unary, truncated rice, or any combination thereof. In this manner, the syntax element binarization block 66 may generate a bin stream, which is supplied to the transcode pipeline 50.

As will be discussed in more detail below, in some embodiments, the transcode pipeline 50 may have the ability to intelligently group bins, such that they may be encoded in parallel. Residual coefficients may consume a significant portion of the bit rate. Further, if exp_golomb is used, the transcoder may encode the exp_golomb values, utilizing additional throughput. Accordingly, in some embodiments, bits may be stored in a buffer and a count per 4×4 block may be obtained. This count may be provided to the transcoder 50, providing an indication of how many bits to obtain. The transcoder 50 may then obtain the relevant bits from the buffer, improving throughput.

The transcode pipeline 50 may then convert the bin stream to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

As discussed above and discussed in more detail below, the transcoding pipeline 50 may encode multiple bins in parallel. This parallel bin encoding may increase throughput in the transcoding pipeline 50, resulting in increased efficiencies in the encoding processes of the video encoding pipeline 34.

Figure 7:
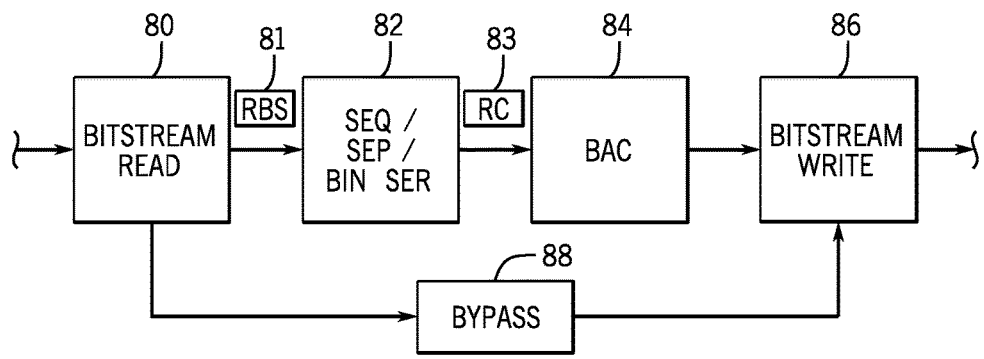
FIG. 7 is block diagram of the transcoding block of the video encoding pipeline of FIG. 6, in accordance with an embodiment.

Turning now to a more detailed discussion of the transcoding pipeline 50, FIG. 7 is a block diagram illustrating hardware circuitry of the transcoding pipeline 50, in accordance with certain embodiments. In certain embodiments, the transcoding pipeline 50 may include the following hardware blocks: a bitstream read block 80, a syntax element parser/sequencer and/or bin serialization block 82, a binary arithmetic encoder block 84, a bitstream write block 86, and a bypass block 88. In some embodiments, only a portion of these blocks may be provided in the transcoding pipeline 50. For example, binary arithmetic encoding is process intensive. To provide increased throughput of the transcoding pipeline 50, in some embodiments, a software pipeline may provide the binary arithmetic encoding outputs to the transcoding pipeline 50. Thus, blocks 80-84 may be in a separate software pipeline that provides an input to the transcoding pipeline 50. In such embodiments, the transcoding pipeline 50 may process the input without being tasked with binary arithmetic encoding.

As mentioned above, the syntax element binarization (SEB) block 66 (of FIG. 6) may generate a bin stream. Additionally, supplemental enhancement information (SEI) markers containing header data may be generated. The SEB block 66 may provide the bin stream and the SEI markers to memory (e.g., dynamic random-access memory (DRAM)). For example, the SEB block 66 may provide the bin stream and SEI markers to DRAM via direct memory access (DMA).

To read the bin stream and SEI marker information, the transcode pipeline 50 may access the stream from memory (e.g., DRAM), for example via DMA. The bitstream read block 80 may receive the bin stream along with the header information from the SEI markers. The bitstream read block 80 may pass the bin stream to blocks 82-86, while writing the header information directly to the bitstream write block 86 via the bypass block 88.

Figure 8:
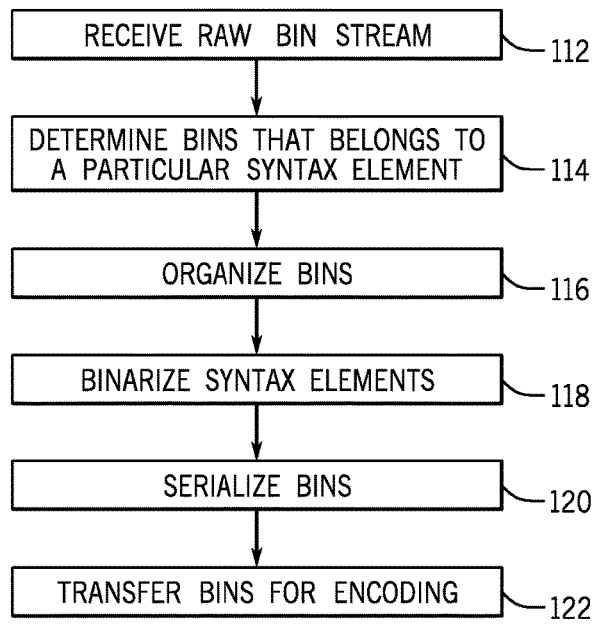
FIG. 8 is a syntax element parsing process implemented by a hardware block, in accordance with an embodiment.

Turning now to a discussion of the syntax element parser (SEP) logic of block 82, FIG. 8 is a syntax element parsing process 110 implemented by hardware block 82. The SEP logic of block 82 may begin by receiving the raw bin stream 81 from the bitstream read block 80 (block 112). As mentioned above, the SEI markers/headers may be removed from the raw bin stream 81. The SEP logic may determine the particular bins of the bin stream 81 that belong to a particular syntax element (block 114). The SEP logic of block 82 may further categorize compressible syntax elements as regular bins and non-compressible syntax elements a bypass bins. Based upon this determination, the SEP organizes the syntax elements (block 116).

The syntax elements are then binarized (block 118). For example, the syntax elements may be binarized using a fixed length code method a truncated rice code method, an exponential golomb-k code method, and/or using a look-up table. For each of these binarization methods, a length of the code is determined. For example the syntax sequencer (SEQ) logic of block 82 may extract a syntax element code from the bin stream 81, calculate a length of the syntax element code, and determine a length of the bits from the bin stream 81. This information may then be provided to SEQ logic in block 82.

For example, after receiving the syntax element code length and/or the length of bits of the bin stream 81 from the SEQ logic, the bin serialization (BIN SER) logic may serialize the bins (block 120). The BIN SER logic may read, from the bin stream 81, a number of bins corresponding to the length of the syntax element code that was provided by the SEQ logic. The read bins are associated with the corresponding syntax element to be encoded by the BAC block 84.

There are two types of bins, regular bins and bypass bins. As mentioned above, the regular bins are encoded based upon their associated context. In contrast, bypass bins are not encoded according to an associated context. Accordingly, in some embodiments, the regular bins have an associated context index, which may be determined by block 82. In some instances (e.g., for certain syntax elements), neighboring CTU information may be used to determine the context index. For example, in some embodiments, the context index is calculated using information from the top and left neighboring CTUs. Additionally and/or alternatively, in some embodiments, for certain syntax elements, the information used to calculate the context index may come directly from the current CTU. In some instances, neighboring information from within the same transform block may be used to determine the context index.

The bins are then transferred to the BAC block 84 for subsequent encoding (block 120). In one embodiment, the bins are provided to the BAC block 84 by generating bin commands 83 to the BAC block 84. For example, to implement parallel encoding of bins, two bin commands 83 may be generated and provided to the BAC block 84.

Figure 9:
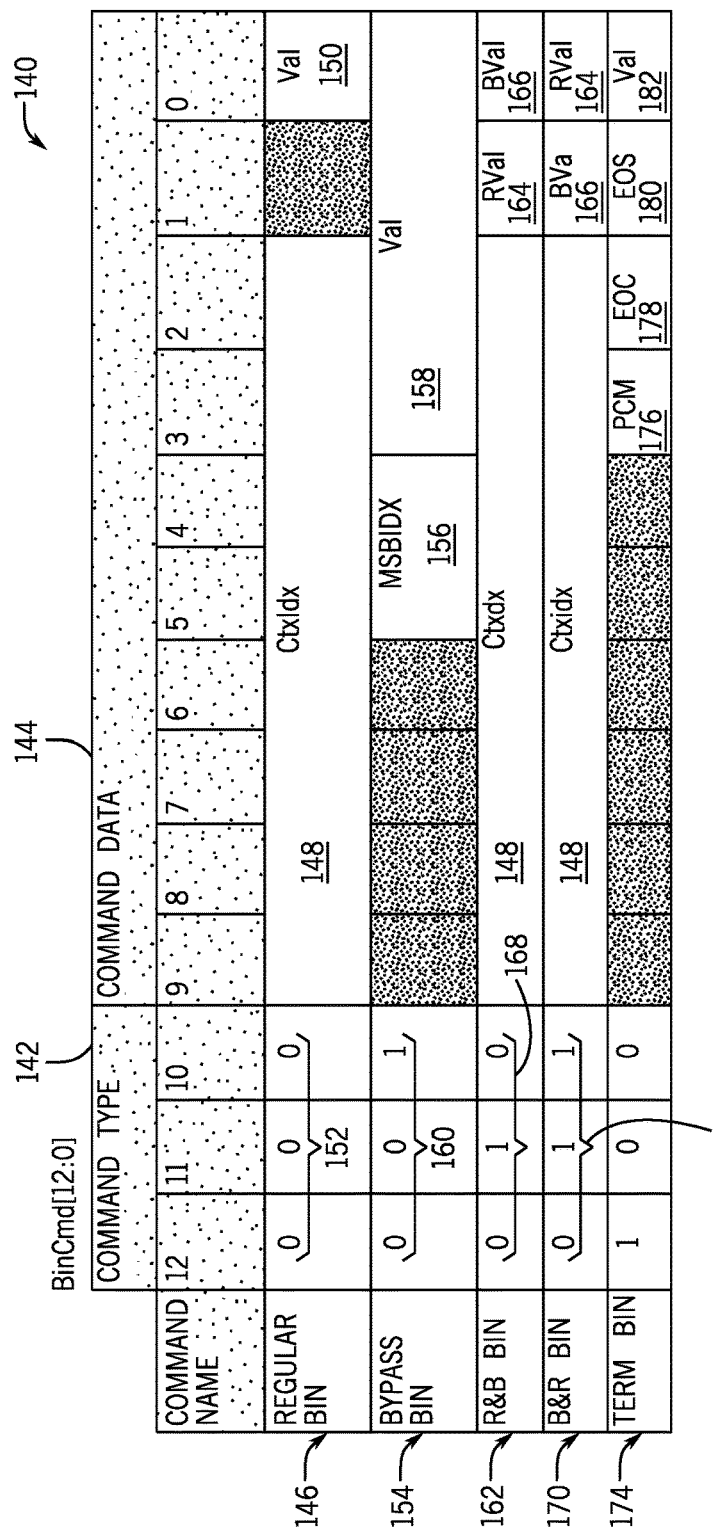
FIG. 9 is a block diagram illustrating bin commands that may be provided to the BAC block to trigger bin encoding, in accordance with an embodiment.

FIG. 9 is a block diagram illustrating bin commands 140 that may be provided to the BAC block 84 to trigger bin encoding, in accordance with an embodiment. In some embodiments, the bin commands 140 may include a command type indication 142 and/or command data 144.

For regular bins, a bin command 146 may include the context identifier 148 associated with the bin, a value field 150, and an indication 152 that the bin command is a regular bin command 146. For example, the command data 144 (e.g., bits 0-9 in the current embodiment) may include the context index 148 (e.g., at bits 2-9 in the current embodiment) and the value 150 (e.g., at bit 0 in the current embodiment). The command type 142 (e.g., at bits 10-12 in the current embodiment) for the regular bin command 146 provides a unique indicator for the regular bin command type (e.g., "000" in the current embodiment).

For bypass bins, a bypass bin command 154 may include a most significant bit index 156 associated with the bin command 154, a value field 158, and an indication 160 that the bin command is a bypass bin command 154. For example, the command data 144 (e.g., bits 0-9 in the current embodiment) may include the most significant bit index 156 (e.g., at bits 4 and 5 in the current embodiment) and the value 158 (e.g., at bits 0-3 in the current embodiment). The command type 142 (e.g., at bits 10-12 in the current embodiment) for the bypass bin command 154 provides a unique indicator for the bypass bin command type (e.g., "001" in the current embodiment).

For a combination of regular and then bypass bins, a bin command 162 may include a context index 148 associated with the bin, a regular bin value field 164, a bypass bin value 166, and an indication 168 that the bin command is a regular then bypass bin command 162. For example, the command data 144 (e.g., bits 0-9 in the current embodiment) may include the context index 148 associated with the bin (e.g., at bits 2-9 in the current embodiment), the regular bin value field 164 (e.g., at bit 1 in the current embodiment), and the bypass bin value 166 (e.g., at bit 0 in the current embodiment). The command type 142 (e.g., at bits 10-12 in the current embodiment) for the regular then bypass bin command 162 provides a unique indicator for the regular then bypass bin command type (e.g., "010" in the current embodiment).

For a combination of bypass then regular bins, a bin command 172 may include a context index 148 associated with the bin, a regular bin value field 164, a bypass bin value 166, and an indication 178 that the bin command is a bypass then regular bin command 162. For example, the command data 144 (e.g., bits 0-9 in the current embodiment) may include the context index 148 associated with the bin (e.g., at bits 2-9 in the current embodiment), the regular bin value field 164 (e.g., at bit 0 in the current embodiment), and the bypass bin value 166 (e.g., at bit 1 in the current embodiment). The command type 142 (e.g., at bits 10-12 in the current embodiment) for the bypass then regular bin command 170 provides a unique indicator for the bypass then regular bin command type (e.g., "011" in the current embodiment).

Upon completion of providing each of the bins via the bin commands 140, a termination bin command 174 may be provided to the BAC block 84, indicating that all of the bins have been provided. The termination bin command 174 may include, in the command data 144 (e.g., at bits 0-9 in the current embodiment), a PCM field 176, an EOC field 178, an EOS field 180, and a value field 182. The command type 142 (e.g., at bits 10-12 in the current embodiment) for the termination command 174 provides a unique indicator for the termination command type (e.g., "100" in the current embodiment).

To support a large sustained bit rate (e.g. 240 Mbits/sec) and high resolution content (e.g., 4096×4096), the transcode pipeline 50 may utilize the parallel processing techniques described herein. More specifically, in some embodiments, the transcoding pipeline 50 may include hardware to generate two (or more) parallel bin commands, for parallel processing of multiple bins.

As mentioned above, the processing of bypass bins may be less complex than processing of regular bins. Accordingly, multiple bypass bins may be processed in the same amount of time as a single regular bin. Thus, in one embodiment, 4 bypass bins may be processed in parallel with 1 regular bin. Accordingly, in such an embodiment, each bin command 140 may facilitate either 4 bypass bins or 1 regular bin. As may be appreciated, when such an embodiment includes circuitry for handling two bin commands 140, the embodiment may process, in parallel: 8 bypass bins (4 bypass bins per each of the two bin commands), 1 regular bin and 4 bypass bins, or 2 regular bins (1 regular bin per each of the two bin commands).

When only one regular bin exists, a single command 146 is provided for the 1 regular bin. If multiple regular bins exist, multiple bin commands 146 may be sent in parallel. For example, in embodiments of the transcode pipeline 50 that can accept two commands 140, two commands 146 may be provided, for pipelines 50 that can accept three commands 140, three commands 146 may be provided, etc.

Similarly, when four or fewer bypass bins exists, a single command 156 is provided for the four or fewer bypass bins. If five or more bypass bins exist, multiple bin commands 154 may be sent in parallel (one for every 4 bypass bins). For example, in embodiments of the transcode pipeline 50 that can accept two commands 140, two commands 146 may be provided for 5-8 bypass bins, for pipelines 50 that can accept three commands 140, three commands 146 may be provided for 9-12 bypass bins, etc.

The commands 162 and 170 follow similar rules, allowing the last single regular bin and the first single bypass bin to be processed according to the command 162 and the last bypass bin and the first regular bin to be processed according to the command 170. In some embodiments, the termination command 174 may be provided as a single command without any parallel commands being provided.

Figure 10:
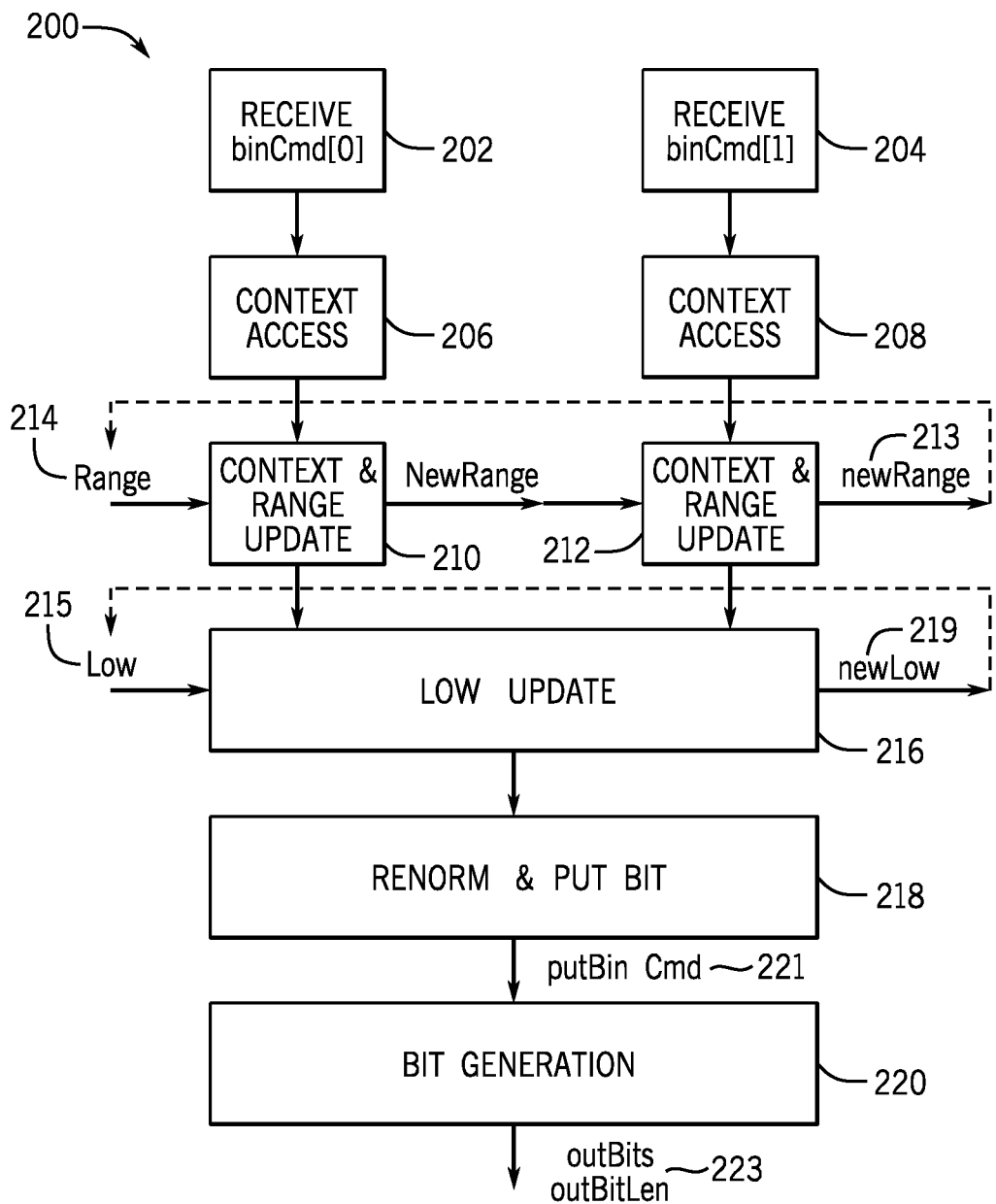
FIG. 10 is a flowchart illustrating a process 200 for BAC block 84 encoding, in accordance with an embodiment.

Based upon the provided commands, the BAC block 84 may encode the bins. FIG. 10 is a flowchart illustrating a process 200 for BAC block 84 encoding, in accordance with an embodiment. Each of the rows in the flowchart may be thought of a pipeline stage, starting with blocks 206 and 208.

First, the BAC block 84 receives bin commands 0 and 1, in parallel (blocks 202 and 204, respectively). As mentioned above, any number of bin commands may be received in parallel, depending on the hardware configuration of the transcode pipeline 50.

Based upon the received commands, any associated contexts are accessed (blocks 206 and 208, respectively). For example, the contexts may be accessed from memory of the system 10. The associated contexts may be discerned from the context index provided in the bin commands, as discussed above with regard to FIG. 9.

Next, the contexts and/or ranges are updated every cycle (blocks 210 and 212). As illustrated, the range 214 may correspond to both bin commands and may be updated for both bin commands each cycle.

Figure 11:
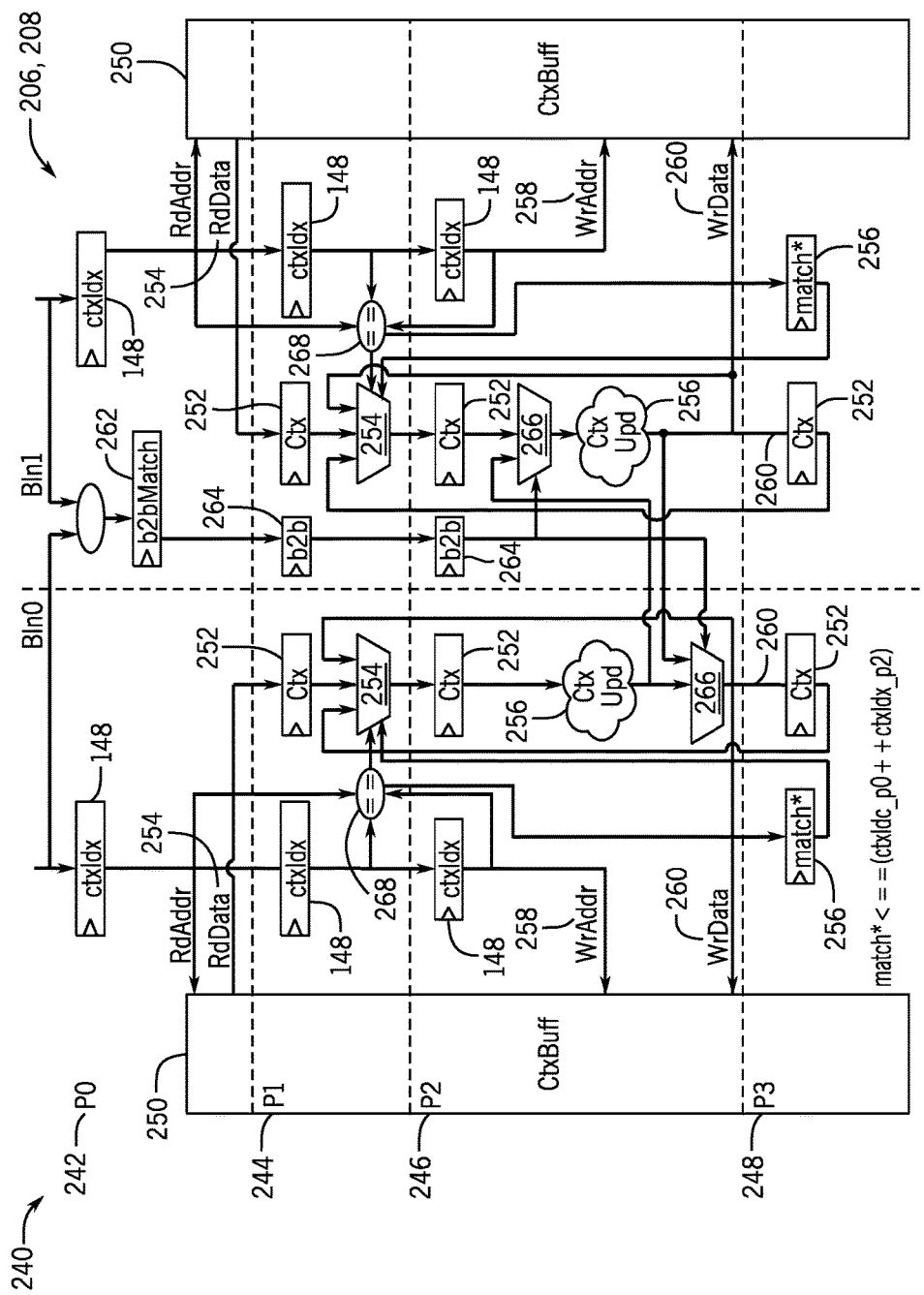
FIG. 11 is a block diagram illustrating an embodiment of hardware capable of implementing context access and context update, in accordance with an embodiment.

FIG. 11 is a block diagram illustrating an embodiment of hardware 240 capable of implementing the context access of blocks 206 and 208 and context update of blocks 210 and 212, in accordance with an embodiment.

As shown in FIG. 11, this hardware 240 has 4 pipeline stages (P0 242, P1 244, P2 246, and P3 248). As discussed in more detail below, the context buffers 250 may be flip-flop based context buffers 250. The hardware 240 provides context reading and write back after context update logic 256 updates a context 252 (e.g., using the context indexes 148 as the write back address 258).

In the first stage, P0 242, the context buffers 250 are read based upon the context indexes 148 received by the hardware 240. In the second stage, P1 244, the read contexts 252 are buffered. This buffering may cut the timing path for the read data (RdData) 254 coming from the context buffers 250.

In the third stage, P2 246, a context update calculation 256 is performed. The updated context is written back to the context buffers 250 (e.g., as illustrated by the address write back 258 and the data write back 260). To support 2 bins/cycle throughput, the context update calculation 256 and write back may be performed in a single cycle.

Additionally, a range update function may run concurrently with the context update calculation 256. Similar to the context update calculation and write back, the range update function and write back may be performed in the single cycle, enabling in 2 bin/cycle throughput. In the third stage, P2 246, the Range Update of blocks 210 and 212 may occur. To facilitate the range update, a new range value (newRange) 213 (of FIG. 10) is computed.

The fourth stage, P3 248, captures the write back data 260 as the context 252 and provides the write back data 260 to stage P1 244. When the context indexes 148 of the P0 stage 242 and P2 stage 246 match, the captured write data 260 may be selected from the MUXs 254, as controlled by the matching logic 256.

The pipeline stages P0-P3 facilitate timing for the microarchitecture. Due to these stage timings and the fact that two contexts are being read/updated every cycle, the context value read from the context buffer 250 and/or being written back to the context buffer 250 may be bypassed by forwarding the latest value in the pipeline. Each of the forward/bypass cases are described below.

In certain embodiments, a single write bypass case may occur in the P2 stage 246. The write bypass is triggered by the bin-to-bin (b2b) match logic 262, which determines when the context indexes between the pair of bin commands match. Upon a match, the b2b logic 264 triggers a process (e.g., via modified selection of the MUXs 266) to forward the updated context 252 from stage P2 246 is forwarded to WrData 260 bus of the first bin command (e.g., Bin0 command). This results in a bypass of the latest version of the data being written back by the first bin command (e.g., Bin0 command).

Read bypasses may also be used. In certain embodiments, 3 read bypass cases may be present, one in stage P2 246 and two in stage P1 244. Starting first with the single stage P2 246 case, a read bypass may occur when there is a context index 148 match between the pair of bin commands determined by the b2b match logic 262. In this case, the updated context from stage P2 246 of the first bin command (e.g., bin0 command) is forwarded to the input of the context update 256 of the second bin command (e.g., bin1 command). This may be done by controlling the MUX 266 of the second bin command via the b2b logic 264. This read bypass results in bypassing the data read in the previous stage from the context buffer 250 and stored in the input side flops of stage P2 246.

Turning now to the first read bypass case occurring in stage P1 244, this read bypass may occur when there is a context index 148 match between stages P1 244 and P2 246 (e.g., when the buffered context read from stage P1 244 is already being updated in stage P2 246), as discerned by the matching logic 268. This read bypass results in bypassing the context read and buffered in stage P1 244 before it gets stored in the input side flops for stage P2 246.

The second read bypass case occurring in stage P1 244 occurs prior to the previous read bypass. In this read bypass, when the context index of both bin commands match (e.g., when the context index in stage P0 242 matches the context index in stage P2 246 or when the context being read in stage P0 242 is already being updated in stage P2 246), a reading of the context is bypassed. While technically detected in stage P0 242, the bypass may be delayed 1 cycle (e.g. to occur in stage P1 244). This delay may avoid placement of a bypass mux 254 on the RdData 254 path, which might be a critical path in the hardware 240.

Having discussed the context access and update hardware 240, additional hardware may, concurrently with the context update, compute new range (newRange) values 213 (of FIG. 10) for all support bin processing modes. As mentioned above, in order to support a 2 bin/cycle throughput, the hardware 300 may compute the values 214 for all supported bin commands in a single cycle. The new range values 213 may be computed based upon the pair of bin commands 140. To do this, the new range 213 computation logic may be structured as 2 bin slices, each slice processing one of the pair of bin commands 140.

Referring back to FIG. 10, the low value 215 is also updated for the bin commands (block 216). For example, the low 215 may correspond to both bin commands and may be updated for both bin commands. To maintain a 2 bins/cycle throughput, this pipeline stage may compute a new low value (newLow) 219 every cycle for the pair of bin commands 140. The newLow value may be a normalized version of an extended Low register with enough bits to hold worst case overflow bits from processing the bin commands. The new low value 219 may be computed using current low and range-based terms. The range-based terms may be computed using logic that is structured in a 2 bin slice structure, one slice for each bin command 140 of the pair of bin commands 140.

From there, a renormalization and put bit process (block 218) may be performed. Here, the bits from an overflow part of the updated low 219 are extracted and renormalized. This process 218 may track outstanding bits and generate put bit commands 221 whenever bits are generated.

Lastly, a bit generation process 220 is performed. In this process 220, in some embodiments buffer incoming put bit commands (e.g., via a 4-deep fifo buffer). Further, the put bit commands 221 generated in process 218 are processed to generate output bits 223, coming from either the outstanding bits of process 218 or determined bits that occur during renormalization of the overflow part of the low 215. The output bits 223 are the final bits that become part of the arithmetic coded part of the bitstream.

As may be appreciated, the transcode pipeline 50 may, thus, encode multiple bins in parallel. Accordingly, the technical effects of the present disclosure include improving operational efficiency of a video encoding pipeline used to encode (e.g., compress) source image data. In some embodiments, the video encoding pipeline may include parallel encoding of multiple bins in the transcoding pipeline. This parallel encoding may increase throughput in the transcoding pipeline, resulting in increased encoding efficiencies.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A video encoding pipeline configured to encode image data, comprising:
 a hardware-based transcode pipeline configured to entropy encode binarized syntax elements used to determine a prediction mode of the video encoding pipeline, at least in part by:
  processing, in parallel, at least one first bin of the binarized syntax elements and at least one second bin of the binarized syntax elements; and
  serializing via a bin serialization block configured to serialize the at least one first bin and the at least one second bin, at least in part by:
   reading, from a raw bin stream, a number of bins corresponding to length of a syntax element code that was provided by bin syntax sequencer (SEQ) logic;
   associating the number of bins with a particular syntax element to be encoded by a binary arithmetic coding (BAC) block; and
   transferring the number of bins to the BAC block, wherein the number of bins are transferred to the BAC block using pairs of bin commands, wherein a first bin command is associated with the at least one first bin and a second bin command is associated with the at least one second bin and wherein the pair of bin commands is configured to instruct the BAC block to encode the at least one first bin in parallel with the at least one second bin;
  wherein the first bin command and the second bin command comprise a command type indicator that indicates whether the at least one first bin and the at least one second bin, respectively, are regular bins, bypass bins, or a combination regular and bypass bin.

2. The video encoding pipeline of claim 1, wherein the hardware-based transcode pipeline comprises a bitstream read block configured to:
 access a bin stream comprising header information for the at least one first bin and the at least one second bin;
 pass a raw bin stream comprising the bin stream without the header information to subsequent processing blocks; and
 pass the header information directly to a bitstream write block, bypassing the subsequent processing blocks.

3. The video encoding pipeline of claim 2, comprising a syntax element binarization (SEB) block in a main encoding pipeline of the video encoding pipeline, wherein the SEB block is configured to:
 generate the bin stream;
 generate the header information via supplemental enhancement information (SEI) markers containing header data; and
 provide the bin stream comprising the SEI markers to a memory for subsequent access by the transcode pipeline.

4. The video encoding pipeline of claim 1, wherein the hardware-based transcode pipeline comprises a syntax element parser block configured to:
 receive a raw bin stream comprising a bin stream without header information;
 determine particular bins of the raw bin stream that are associated with a particular syntax element of the binarized syntax elements;
 if the particular syntax element is a compressible syntax element, determine that the particular bins associated with the particular syntax element are regular bins; and
 if the particular syntax element is a non-compressible syntax element, determine that the particular bins associated with the particular syntax element are bypass bins.

5. The video encoding pipeline of claim 4, wherein the raw bin stream is received from a bitstream read block configured to:
 access a bin stream comprising header information for the at least one first bin and the at least one second bin;
 pass the raw bin stream to subsequent processing blocks; and
 pass the header information directly to a bitstream write block, bypassing the subsequent processing blocks.

6. The video encoding pipeline of claim 4, wherein the hardware-based transcode pipeline comprises a syntax sequencer block configured to:
 extract a syntax element code from the raw bin stream;
 calculate a length of the syntax element code; and
 determine a length of bits from the raw bin stream.

7. The video encoding pipeline of claim 1, wherein the first bin command comprises 4 bypass bins or 1 regular bin.

8. The video encoding pipeline of claim 7, wherein the second bin command comprises 4 bypass bins or 1 regular bin.

9. The video encoding pipeline of claim 1, wherein the hardware-based transcode pipeline comprises a binary arithmetic coding (BAC) block, comprising:
 a context access pipeline stage, configured to access any contexts associated with the at least one first bin and the at least one second bin;
 a context and range update pipeline stage, configured to update a context and range based upon the at least one first bin and the at least one second bin;
 a low update pipeline stage, configured to update a single low value for both of the at least one first bin and the at least one second bin;
 a renormalization and put bit pipeline stage, configured to:
  extract and normalize bits from an overflow part of the updated single low value;
  track outstanding bits; and
  generate put bit commands whenever bits are generated; and
 a bit generation pipeline stage, configured to process the put bit commands to generate output bits.

10. The video encoding pipeline of claim 9, wherein the BAC block is configured to receive a first bin command associated with the at least one first bin and a second bin command associated with the at least second bin command.

11. The video encoding pipeline of claim 10, wherein the first bin command and the second bin command comprise a command data field that comprises:
 a context identifier when at least one of the bins associated with the first bin command or the second bin command, respectively, comprises a regular bin;
 a single bin value field when all bins associated with the first bin command or the second bin command, respectively, comprises a regular bin or a bypass bin; and
 a regular bin value field and a bypass bin value field when the bins associated with the first bin command or the second bin command, respectively, comprises both regular bins and bypass bins.

12. A tangible, non-transitory, computer-readable medium configured to store instructions executable by a processor in a video encoding pipeline, wherein the instructions comprise instructions to:
  process, in parallel, at least one first bin of binarized syntax elements and at least one second bin of the binarized syntax elements;
  serialize the at least one first bin and the at least one second bin, at least in part by:
    reading, from a raw bin stream, a number of bins corresponding to length of a syntax element code that was provided by bin (syntax sequencer) SEQ logic;
    associating the number of bins with a particular syntax element to be encoded by a binary arithmetic coding (BAC) block; and
    transferring the number of bins to the BAC block, wherein the number of bins are transferred to the BAC block using pairs of bin commands, wherein a first bin command is associated with the at least one first bin and a second bin command is associated with the at least one second bin;
  generate first and second bin commands, wherein the first bin command instructs the BAC block to process the at least one first bin of a set of binarized syntax elements and the second bin command instructs the BAC block to process the at least one second bin of the set of binarized syntax elements, wherein the first bin command and the second bin command comprise a command type indicator that indicates whether the at least one first bin and the at least one second bin, respectively, are regular bins, bypass bins, or a combination regular and bypass bin; and
  provide the first and second bin commands, in parallel, to the BAC block, such that the bin commands are processed by the BAC block in parallel, resulting in parallel encoding of the first and second bins.

13. The computer-readable medium of claim 12, comprising instructions to generate a regular bin command, the regular bin command comprising:
  a command type of "000" to indicate a regular bin type;
  a context index; and
  a bin value.

14. The computer-readable medium of claim 13, wherein the instructions to generate the regular bin comprising instructions to:
  place the bin value at bit 0 of the regular bin command;
  place the context index at bits 2-9 of the regular bin command; and
  place the command type in bits 10-12 of the regular bin command.

15. A video encoding pipeline configured to encode image data, comprising:
  a binary arithmetic coder (BAC) block configured to encode at least one first bin associated with binarized syntax elements of the video encoding pipeline, in parallel with at least one second bin associated with the binarized syntax elements, at least in part by:
    serializing the at least one first bin and the at least one second bin via a bin serialization block configured to serialize, at least in part by:
      reading, from a raw bin stream, a number of bins corresponding to the length of the syntax element code that was provided by bin syntax sequencer (SEQ) logic;
      associating the number of bins with the particular syntax element to be encoded by the BAC block; and
      transferring the number of bins to the BAC block, wherein the number of bins are transferred to the BAC block using pairs of bin commands, wherein a first bin command is associated with the at least one first bin and a second bin command is associated with the at least one second bin and wherein the pair of bin commands is configured to instruct the BAC block to encode the at least one first bin in parallel with the at least one second bin, wherein the first bin command and the second bin command comprise a command type indicator that indicates whether the at least one first bin and the at least one second bin, respectively, are regular bins, bypass bins, or a combination regular and bypass bin;
    accessing any contexts associated with the at least one first bin and the at least one second bin, the first bin being represented in a first bin command received by the BAC block and the at least one second bin being represented in a second bin command received by the BAC block;
    updating a context and range based upon the at least one first bin and the at least one second bin;
    updating a single low value for both of the at least one first bin and the at least one second bin;
    extract and normalize bits from an overflow part of the updated single low value;
    track outstanding bits; and
    generate put bit commands whenever bits are generated; and
    process the put bit commands to generate output bits.

16. The video encoding pipeline of claim 15, wherein the video encoding pipeline comprises a context buffer configured to store the contexts associated with the at least one first bin and the at least one second bin;
  wherein the BAC block comprises a context access and update block, comprising:
    a first stage configured to read a context ("read context") from the context buffer;
    a second stage configured to buffer the read context;
    a third stage configured to perform a context update calculation and write a result of the context update calculation to the context buffer; and
    a fourth stage configured to capture write back data for forwarding to the second stage.

17. The video encoding pipeline of claim 15, comprising a hardware-based transcode pipeline configured to entropy encode binarized syntax elements;
  wherein the BAC block is implemented by machine-readable instructions in a separate pipeline from the transcode pipeline and the BAC block provides an output for input to the transcode pipeline.

\* \* \* \* \*